United States Patent
Motoi (10) Patent No.: US 10,573,877 B2
(45) Date of Patent: Feb. 25, 2020

(54) LEAD-ACID BATTERY, NEGATIVE ELECTRODE PLATE THEREOF AND METHOD FOR PRODUCING LEAD-ACID BATTERY

(71) Applicant: GS Yuasa International Ltd., Kyoto-shi, Kyoto (JP)

(72) Inventor: Ikumi Motoi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 629 days.

(21) Appl. No.: 15/040,508

(22) Filed: Feb. 10, 2016

(65) Prior Publication Data
US 2016/0240844 A1 Aug. 18, 2016

(30) Foreign Application Priority Data
Feb. 12, 2015 (JP) ................. 2015-024888

(51) Int. Cl.
  *H01M 4/04* (2006.01)
  *H01M 4/62* (2006.01)
  *H01M 4/20* (2006.01)
  *H01M 10/06* (2006.01)

(52) U.S. Cl.
  CPC ........... *H01M 4/0416* (2013.01); *H01M 4/20* (2013.01); *H01M 4/627* (2013.01); *H01M 10/06* (2013.01); *Y02E 60/126* (2013.01)

(58) Field of Classification Search
  CPC ...... H01M 4/0416; H01M 4/20; H01M 4/627; H01M 10/06
  See application file for complete search history.

(56) References Cited

U.S. PATENT DOCUMENTS

| | | | |
|---|---|---|---|
| 6,074,782 A * | 6/2000 | Mizutani ................. | H01M 4/14 429/215 |
| 2008/0241686 A1 | 10/2008 | Sugie | |
| 2012/0248383 A1* | 10/2012 | Atanassova ............. | H01M 4/56 252/506 |
| 2014/0134482 A1* | 5/2014 | Okamoto ................ | H01M 4/14 429/204 |
| 2015/0140430 A1 | 5/2015 | Kohei | |

FOREIGN PATENT DOCUMENTS

| | | | | |
|---|---|---|---|---|
| JP | 61148763 A | * | 7/1986 | ........... H01M 4/627 |
| JP | 61148763 A2 | | 7/1986 | |
| JP | 10040906 A2 | | 2/1998 | |
| JP | 2004111198 A2 | | 4/2004 | |

(Continued)

OTHER PUBLICATIONS

Machine Translation of JP 2014139882 A. (Year: 2014).*

(Continued)

*Primary Examiner* — Jonathan G Jelsma
(74) *Attorney, Agent, or Firm* — Rankin, Hill & Clark LLP (57) ABSTRACT

A lead-acid battery includes a negative electrode plate; a positive electrode plate; and an electrolyte solution, the negative electrode plate including a negative electrode material containing an inorganic sulfate and an anti-shrink agent, the inorganic sulfate having a 111 crystal plane or an average secondary particle size of 3.8 μm or more, the anti-shrink agent being adsorbed to the inorganic sulfate.

15 Claims, 4 Drawing Sheets

(56) References Cited

FOREIGN PATENT DOCUMENTS

| JP | 2006140033 | A2 |   | 6/2006  |
|----|------------|----|---|---------|
| JP | 2008277244 | A  | * | 11/2008 |
| JP | 4400028    | B2 |   | 1/2010  |
| JP | 2012043594 | A  | * | 3/2012  |
| JP | 2013041848 | A2 |   | 2/2013  |
| JP | 5223039    | A2 |   | 6/2013  |
| JP | 2014063689 | A  | * | 4/2014  |
| JP | 2014139882 | A  | * | 7/2014  |

OTHER PUBLICATIONS

Machine Translation of JP 2012043594 A. (Year: 2012).*
D.A.J. Rand, D.P. Boden, C.S. Lakshmi, R.F. Nelson, R.D. Prengaman, "Manufacturing and operational issues with lead-acid batteries", Apr. 30, 2002, Journal of Power Sources 107, pp. 280-300. (Year: 2002).*
Bernt O. Myrvold, "Interactions between lignosulphonates and the components of the lead-acid battery Part 1. Adsorption isotherms", May 15, 2003, Journal of Power Sources 117, pp. 187-202. (Year: 2003).*
Pavlov, Nikolov, Rogachev, "Influence of expander components on the processes at the negative plates of lead-acid cells on high-rate partial-state-of-charge cycling. Part.1: Effect of lignosulfonates and BaSO4 on the processes of charge and discharge of negative plates", Journal of Power Sources, 4435-4443, 2010.*

\* cited by examiner

| BARIUM SULFATE: ADSORPTION AMOUNT OF ORGANIC ANTI-SHRINK AGENT BY BARIUM SULFATE (g/100g) | 11 | 13 | 15 | 17 | 19 | 21 |
|---|---|---|---|---|---|---|
| EXTERNAL APPEARANCE OF THE POSITIVE ELECTRODE PLATE AFTER 1440 CYCLES | | | | | | |

FIG. 4

LEAD-ACID BATTERY, NEGATIVE ELECTRODE PLATE THEREOF AND METHOD FOR PRODUCING LEAD-ACID BATTERY

CROSS-REFERENCE TO RELATED APPLICATIONS

This application claims the benefit of Japanese patent application No. 2015-024888 filed on Feb. 12, 2015, which is incorporated by reference.

FIELD

The present invention relates to a lead-acid battery including a negative electrode material containing a bisphenol condensation product, a negative electrode plate thereof, and a method for producing a lead-acid battery.

BACKGROUND

A negative electrode material of a lead-acid battery contains barium sulfate, lignin sulphonic acid and carbon such as carbon black in addition to spongy lead. It is known that cycle life performance is improved when a bisphenol condensation product is added instead of lignin sulphonic acid.

Japanese Patent No. 4400028 discloses a method for producing a barium sulfate dispersion in which primary particles of barium sulfate are dispersed. In Japanese Patent No. 4400028, water-soluble barium sulfide is produced by reducing barite (natural barium sulfate) with coke, and reacted with sulfuric acid to produce the barium sulfate dispersion. Barium sulfate in the dispersion is washed with water without being dried, and is added to a negative electrode material for a lead-acid battery. Since the barium sulfate produced by reacting barium sulfide with sulfuric acid is used in the state of being dispersed in water, secondary particles formed by aggregation of primary particles do not grow. Japanese Patent No. 4400028 discloses that when 1 part by mass of a bisphenol condensation product based on 100 parts by mass of barium sulfate is added to the barium sulfate dispersion, the life performance of a lead-acid battery is improved.

The inventor has confirmed that when a negative electrode material contains a bisphenol condensation product, softening of a positive electrode material is accelerated. For this mechanism, the inventor made the following assumption. A bisphenol condensation product is more easily dissolved in sulfuric acid as an electrolyte solution in comparison with lignin sulfonic acid (hereinafter, referred to as "lignin"). When the bisphenol condensation product is eluted from the negative electrode into the electrolyte solution and reaches the positive electrode, softening of the positive electrode material is accelerated.

The inventor studied fixation of the bisphenol condensation product to the negative electrode. The negative electrode material contains lipophilic carbon, and thus allows the bisphenol condensation product to easily adsorb thereto. However, since carbon is added for forming a conductive network in the negative electrode material, it is not preferred that the insulating bisphenol condensation product is adsorbed to the negative electrode material. Thus, the inventor studied fixation of the bisphenol condensation product in the negative electrode material rather than depending on carbon.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to suppress elution of an anti-shrink agent into an electrolyte solution by fixing the anti-shrink agent by an inorganic sulfate in an electrolyte solution material.

A lead-acid battery according to an aspect of the present invention includes: a negative electrode plate; a positive electrode plate; and an electrolyte solution, the negative electrode plate including a negative electrode material containing an inorganic sulfate and an anti-shrink agent, the inorganic sulfate having a 111 crystal plane, the anti-shrink agent being adsorbed to the inorganic sulfate.

BRIEF DESCRIPTION OF DRAWINGS

The foregoing and other features of the present invention will become apparent from the following description and drawings of an illustrative embodiment of the invention in which.

DESCRIPTION OF EMBODIMENTS

First Aspect:

There is provided a lead-acid battery including: a negative electrode plate; a positive electrode plate; and an electrolyte solution, the negative electrode plate including a negative electrode material containing an inorganic sulfate and an anti-shrink agent, the inorganic sulfate having a 111 crystal plane, the anti-shrink agent being adsorbed to the inorganic sulfate.

Second Aspect:

In the lead-acid battery according to the first aspect, the amount of the anti-shrink agent adsorbed to the inorganic sulfate may be 15 g/100 g or more Third Aspect:

There is provided a lead-acid battery including: a negative electrode plate; a positive electrode plate; and an electrolyte solution, the negative electrode plate including a negative electrode material containing an inorganic sulfate and an anti-shrink agent, the inorganic sulfate having an average secondary particle size of 3.8 μm or more.

Fourth Aspect:

In the lead-acid battery according to any one of the first to third aspects, the anti-shrink agent in the negative electrode material may be an organic anti-shrink agent.

Fifth Aspect:
In the lead-acid battery according to any one of the first to fourth aspects, the amount of the anti-shrink agent adsorbed to the inorganic sulfate may not less than 15 g/100 g and not more than 21 g/100 g.

Sixth Aspect:
In the lead-acid battery according to any one of the first to fourth aspects, the amount of the anti-shrink agent adsorbed to the inorganic sulfate may not less than 17 g/100 g and not more than 21 g/100 g.

Seventh Aspect:
In the lead-acid battery according to any one of the first to fourth aspects, the amount of the anti-shrink agent adsorbed to the inorganic sulfate may not less than 15 g/100 g and not more than 19 g/100 g.

Eighth Aspect:
In the lead-acid battery according to any one of the first to fourth aspects, the amount of the anti-shrink agent adsorbed to the inorganic sulfate may not less than 17 g/100 g and not more than 19 g/100 g.

Ninth Aspect:
In the lead-acid battery according to any one of the first to eighth aspects, the content of the inorganic sulfate in the negative electrode material may not less than 0.4 mass % and not more than 1.6 mass %.

Tenth Aspect:
In the lead-acid battery according to any one of the first to eighth aspects, the content of the inorganic sulfate in the negative electrode material may not less than 0.4 mass % and not more than 1.5 mass %.

Eleventh Aspect:
In the lead-acid battery according to any one of the first to eighth aspects, the content of the inorganic sulfate in the negative electrode material may not less than 0.4 mass % and not more than 1.2 mass %.

Twelfth Aspect:
In the lead-acid battery according to any one of the first to eighth aspects, the content of the inorganic sulfate in the negative electrode material may not less than 0.6 mass % and not more than 1.0 mass %.

Thirteenth Aspect:
In the lead-acid battery according to any one of the first to twelfth aspects, the content of the anti-shrink agent in the negative electrode material may not less than 0.03 mass % and not more than 0.25 mass %.

Fourteenth Aspect:
In the lead-acid battery according to any one of the first to twelfth aspects, the content of the anti-shrink agent in the negative electrode material may not less than 0.05 mass % and not more than 0.20 mass %.

Fifteenth Aspect:
In the lead-acid battery according to any one of the first to fourteenth aspects, the anti-shrink agent in the negative electrode material may be an organic synthetic anti-shrink agent.

Sixteenth Aspect:
In the lead-acid battery according to any one of the first to fifteenth aspects, the anti-shrink agent in the negative electrode material may be a bisphenol condensation product.

Seventeenth Aspect:
In the lead-acid battery according to any one of the first to sixteenth aspects, the inorganic sulfate in the negative electrode material may be barium sulfate.

Eighteenth Aspect:
There is provided a method for producing a lead-acid battery, the method including: providing an inorganic sulfate having a 111 crystal plane; adsorbing an anti-shrink agent to the inorganic sulfate in an amount of 15 g/100 g or more; and filling a negative electrode current collector with a paste which contains a lead powder and the inorganic sulfate with the anti-shrink agent adsorbed thereto, to produce a negative electrode plate.

Nineteenth Aspect:
In the method for producing a lead-acid battery, according to the eighteenth aspect, the inorganic sulfate may be barium sulfate, and the anti-shrink agent may be a bisphenol condensation product.

The lead-acid battery according to an aspect of the present invention includes: a negative electrode plate; a positive electrode plate; and an electrolyte solution, the negative electrode plate including a negative electrode material containing an inorganic sulfate having a 111 crystal plane, and an anti-shrink agent, the anti-shrink agent being adsorbed to the inorganic sulfate.

The lead-acid battery according to an aspect of the present invention includes: a negative electrode plate; a positive electrode plate; and an electrolyte solution, the negative electrode plate including a negative electrode material containing an inorganic sulfate having a 111 crystal plane, and an anti-shrink agent, the anti-shrink agent being adsorbed to the inorganic sulfate in an amount of 15 g/100 g or more.

The lead-acid battery according to an aspect of the present invention includes: a negative electrode plate; a positive electrode plate; and an electrolyte solution, the negative electrode plate including a negative electrode material containing an inorganic sulfate having an average secondary particle size of 3.8 µm or more, and an anti-shrink agent.

The lead-acid battery according to an aspect of the present invention includes an organic anti-shrink agent as the anti-shrink agent in the negative electrode material.

The lead-acid battery according to an aspect of the present invention includes an organic synthetic anti-shrink agent as the anti-shrink agent in the negative electrode material.

The lead-acid battery according to an aspect of the present invention includes a bisphenol condensation product as the anti-shrink agent in the negative electrode material.

The lead-acid battery according to an aspect of the present invention includes barium sulfate as an inorganic sulfate in the negative electrode material.

The negative electrode plate for the lead-acid battery according to an aspect of the present invention includes a negative electrode material and a current collector, the negative electrode material containing an inorganic sulfate having a 111 crystal plane, and an anti-shrink agent.

The method for producing a lead-acid battery according to an aspect of the present invention includes adsorbing an anti-shrink agent to an inorganic sulfate having a 111 crystal plane, and then filling a negative electrode current collector with a paste which contains a lead powder and barium sulfate with a bisphenol condensation product adsorbed thereto, to produce a negative electrode plate.

The method for producing a lead-acid battery according to an aspect of the present invention includes adsorbing a bisphenol condensation product to barium sulfate having a 111 crystal plane, and then filling a negative electrode current collector with a paste which contains a lead powder and the barium sulfate with the bisphenol condensation product adsorbed thereto, to produce a negative electrode plate. In this specification, descriptions of the lead-acid battery apply to the method for producing a negative electrode plate and a lead-acid battery.

The DBP oil absorption amount represents the amount of dibutyl phthalate (DBP) adsorbed by a powder, its unit is mL/100 g, and the method for measurement thereof is specified in JIS K 6217-4. Barium sulfate forms aggregates (secondary particles) through aggregation of primary particles, and DBP is adsorbed in gaps between primary particles. Accordingly, the larger the secondary particles, the greater the DBP oil absorption amount. That is, the DBP oil absorption amount represents the strength of a structure formed by aggregation of primary particles of barium sulfate, in other words, the degree of development of aggregates.

Figure 1:
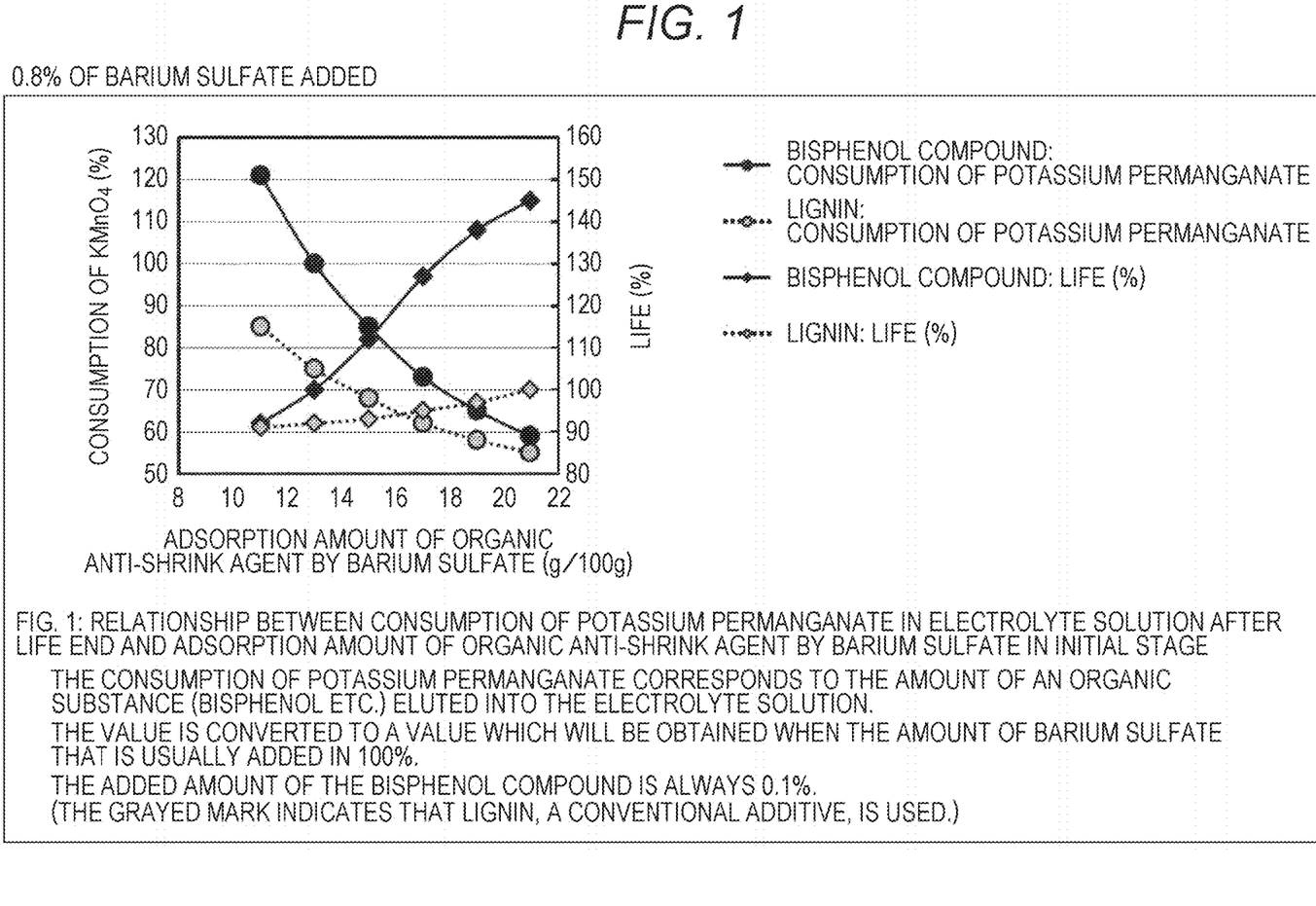
FIG. 1 is a characteristic diagram showing relations between the amount of an anti-shrink agent adsorbed to barium sulfate and the consumption of $KMnO_4$ in an electrolyte solution after the life end, and the amount of an anti-shrink agent and the life.
Figure 2:
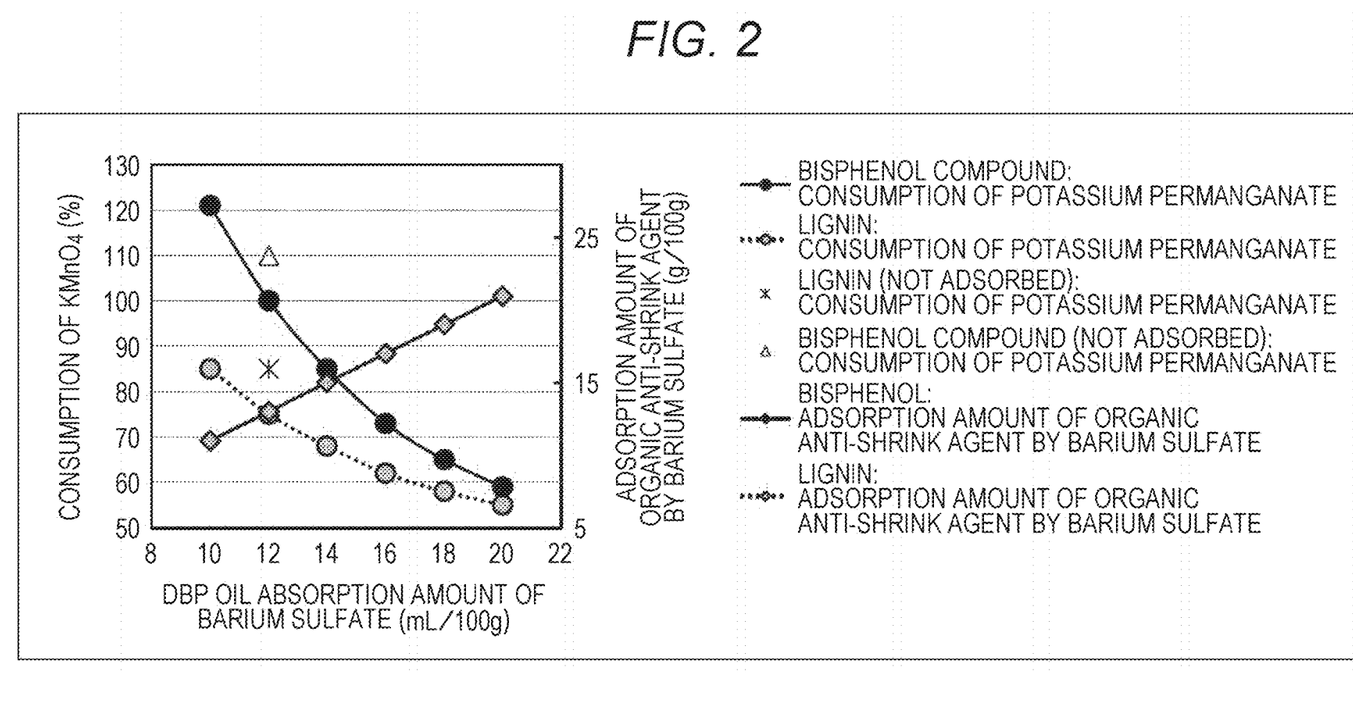
FIG. 2 is a characteristic diagram showing relations between a DBP oil absorption amount of barium sulfate and the consumption of $KMnO_4$, and the DBP oil absorption amount and a mount of an anti-shrink agent adsorbed to barium sulfate.

The inventor supposed that when an organic anti-shrink agent (bisphenol condensation product etc.) is adsorbed beforehand to barium sulfate in which aggregates are developed, elution of the organic anti-shrink agent (bisphenol condensation product etc.) into an electrolyte solution can be reduced. Thus, an organic anti-shrink agent (bisphenol condensation product etc.) was adsorbed to barium sulfate beforehand, and a lead powder, carbon and the like were then added thereto to provide a negative electrode material paste. A lead-acid battery was produced using the paste, and the initial amount of the organic anti-shrink agent adsorbed to barium sulfate was measured. The cycle life performance of the lead-acid battery was measured, an electrolyte solution was collected after the battery reached the life end, and the consumption of $KMnO_4$ was measured. Resultantly, as shown in FIG. 1, life performance was improved and the consumption of $KMnO_4$ decreased as the amount of the organic anti-shrink agent adsorbed to barium sulfate increased. The consumption of $KMnO_4$ represents the concentration of the bisphenol condensation product flowing out into the electrolyte solution. It is apparent that the adsorption amount of the organic anti-shrink agent increases as the DBP oil absorption amount of barium sulfate increases as shown in FIG. 2. From this, the amount of the organic anti-shrink agent adsorbed to barium sulfate can be controlled by changing the DBP oil absorption amount.

The results in FIG. 1 show that by using barium sulfate that allows a large amount of an organic anti-shrink agent to adsorb to the barium sulfate, an organic anti-shrink agent (bisphenol condensation product etc.) can be fixed in a negative electrode material, softening of a positive electrode material can be thereby suppressed, and the effect of the bisphenol condensation product in the negative electrode material can be retained.

Table 1 and FIG. 2 show that the amount of an organic anti-shrink agent adsorbed to barium sulfate can be adjusted by changing the average secondary particle size of barium sulfate. The amount of an organic anti-shrink agent adsorbed to barium sulfate can be controlled by adjusting the DBP oil absorption amount of barium sulfate, and the DBP oil absorption amount of barium sulfate can be adjusted by changing the average secondary particle size of barium sulfate. Barium sulfate that has been used in lead-acid batteries heretofore has a DBP oil absorption amount of 12 mL/100 g or less. Barium sulfate having a large DBP oil absorption amount generally has a large average secondary particle size. The amount of the organic anti-shrink agent adsorbed to barium sulfate at the life end was measured, and the result showed that it was the same as that in the initial stage. Since barium sulfate retains the bisphenol condensation product until the life end of the lead-acid battery, it is considered that bisphenol is not retained as a liquid, but adsorbed to the surface of barium sulfate. In the present invention, the amount of an organic anti-shrink agent adsorbed to barium sulfate is set to 15 g/100 g or more, and thus a bisphenol condensation product can be adsorbed to barium sulfate beforehand, and retained until the life end, so that the life performance of a lead-acid battery is improved.

Japanese Patent No. 4400028 discloses that a bisphenol condensation product is added to a dispersion of barium sulfate, but the barium sulfate in Japanese Patent No. 4400028 is monodispersed, and may have a small DBP oil absorption amount. The amount of the bisphenol condensation product is 1 mass % based on the amount of barium sulfate, and thus it will be difficult to fix a large amount of the bisphenol condensation product in barium sulfate.

It is important that barium sulfate adsorbs an organic anti-shrink agent in an amount of 15 g/100 g or more, and there is no upper limit on the adsorption amount. However, a practical method for producing barium sulfate which ensures that the adsorption amount is more than 21 g/100 g is not established yet at the present time. Therefore, the adsorption amount is preferably not less than 15 g/100 g and not more than 21 g/100 g.

The bisphenol condensation product is formed by polycondensation of a sulfonated product of a bisphenol such as, for example, bisphenol A, F or S. The bisphenol may contain a carboxyl group, an amino group and the like in addition to a sulfone group, and the condensation is dehydration condensation by, for example, formaldehyde.

Addition of a bisphenol condensation product to a negative electrode material is well known, and the type, molecular weight and so on of the bisphenol condensation product can be appropriately changed according to a known technique.

The concentration of barium sulfate in the negative electrode material is not less than 0.4 mass % and not more than 1.6 mass %, preferably not less than 0.4 mass % and not more than 1.5 mass %, more preferably not less than 0.6 mass % and not more than 1.2 mass %, further preferably not less than 0.6 mass % and not more than 1.0 mass %. The concentration of the bisphenol condensation product is preferably not less than 0.03 mass % and not more than 0.25 mass %, more preferably not less than 0.05 mass % and not more than 0.2 mass %. High life performance is achieved when these concentrations each fall within the above-mentioned range (Tables 2 and 3).

When the inorganic sulfate in the negative electrode material is one having a 111 crystal plane, it has no negative influence in the battery like barium sulfate, and can be made to serve as a nucleus of lead sulfate. When the anti-shrink agent is adsorbed in an amount of 15 g/1.00 g or more to the inorganic sulfate, the anti-shrink agent can be inhibited from flowing out into an electrolyte solution.

When the inorganic sulfate in the negative electrode material is one having a DBP oil absorption amount of 14 mL/100 g or more and having a 111 crystal plane, the anti-shrink agent can be adsorbed in an amount of 15 g/100 g or more. Therefore the anti-shrink agent can be inhibited from flowing out into an electrolyte solution.

It is preferred that the inorganic sulfate in the negative electrode material has an average secondary particle size of 3.8 μm or more because the anti-shrink agent can be adsorbed in an amount of 15 g/100 g or more.

It is preferred that the anti-shrink agent to be adsorbed to the inorganic sulfate is an organic synthetic anti-shrink agent, particularly a bisphenol condensation product because the anti-shrink agent can be inhibited from flowing out, and also the life is improved.

An example of the invention of the present application will be shown below. In carrying out the invention of the present application, the example may be appropriately changed in accordance with common knowledge of a person skilled in the art and disclosure of the prior arts. A plate includes a current collector such as a grid, and an electrode material, an electrolyte solution with which the plate is impregnated is not included in the electrode material. In the example, spongy lead as a negative active material as well as other electrode materials such as a bisphenol condensation product and barium sulfate are collectively called a negative active material, and a positive electrode material is called a positive active material even when the positive active material contains an additive other than $PbO_2$.

Barium sulfate is used as an inorganic salt in the example, but the inorganic salt is not limited to barium sulfate as long as it has an oil absorbing property, does not chemically contribute to a lead electrode reaction, has the same structure as the crystal structure of lead sulfate, and has no negative influence as a salt on a lead compound, and for example, calcium sulfate and strontium sulfate are effective in inhibiting an anti-shrink agent from flowing out into an electrolyte solution.

As an anti-shrink agent, one obtained by dehydration condensation of a sulfonated product of bisphenol A and formaldehyde is used as a typical example of the bisphenol condensation product. However, as long as the anti-shrink agent is a lipophilic organic substance, i.e. organic anti-shrink agent, it is adsorbed to be inhibited from flowing out into an electrolyte solution.

EXAMPLE

Production of Lead-Acid Battery

Barium sulfate was provided in such a manner that the adsorption amount of an organic anti-shrink agent was changed in the range of 11 to 21 g/100 g. Specifically, the DBP oil absorption amount was changed in the range of 10 mL/100 g to 20 mL/100 g. Among them, oil absorption amounts of 10 mL/100 g and 12 mL/100 g have been previously employed in lead-acid batteries. Characteristics of the lead-acid battery are shown where the result with barium sulfate having an oil absorption amount of 12 mL/100 g is fixed to 100%. The accuracy of the DBP oil absorption amount is within ±1 mL/100 g.

As the bisphenol condensation product, one obtained by dehydration condensation of a sulfonated product of bisphenol A and formaldehyde was used. An aqueous solution obtained by dissolving a bisphenol condensation product, which constituted a predetermined content based on the amount of an active material, in water in an amount of 60 mass % of the amount of water necessary during preparation of a negative active material paste, and barium sulfate were added in a mixer, and stirred for 20 minutes or more to adsorb the bisphenol condensation product to the barium sulfate, Lignin, which was similarly adsorbed to barium sulfate, was provided.

In addition, conventional lignin sulfonic acid (hereinafter, referred to simply as lignin), which was not adsorbed to barium sulfate, was provided.

The aqueous solution containing barium sulfate with a bisphenol condensation product or lignin adsorbed thereto, or a bisphenol condensation product or lignin and barium sulfate was (were) mixed with a lead powder, carbon black and a synthetic fiber reinforcement agent, and the mixture was mixed in sulfuric acid to provide a negative active material paste. The type of the lead powder, the type and content of carbon black or the like, presence/absence of the synthetic fiber reinforcement agent, and the type and presence/absence of other additives are arbitrary.

The negative active material paste was filled into a Pb—Ca—Sn-based expanded grid, and dried and cured to provide an unformed negative electrode plate. The synthetic fiber reinforcement agent was added to the lead powder, and the mixture was impasted with sulfuric acid to provide a positive active material paste. The positive active material paste was filled into a Pb—Ca—Sn-based expanded grid, and dried and cured to provide an unformed positive electrode plate. The negative electrode plate was covered with a separator including a polyethylene microporous bag, set in a container together with the positive electrode plate, and subjected to formation in the container with addition of sulfuric acid to provide a liquid-type lead-acid battery. The lead-acid battery includes five positive electrode plates and four negative electrode plates, and has a power of 2 V/cell. The type of the lead powder to be used in the positive electrode plate, presence/absence of the synthetic fiber reinforcement agent, presence/absence of other additives, the type of the current collector in the positive electrode and negative electrode such as a grind or spine, the type of the grid such as a cast or expanded grid, and the composition of the grid, the type of the storage battery such as a liquid type or VRLA, the type of the separator, and so on are arbitrary. The formation condition such as container formation or tank formation is also arbitrary.

Figure 3:
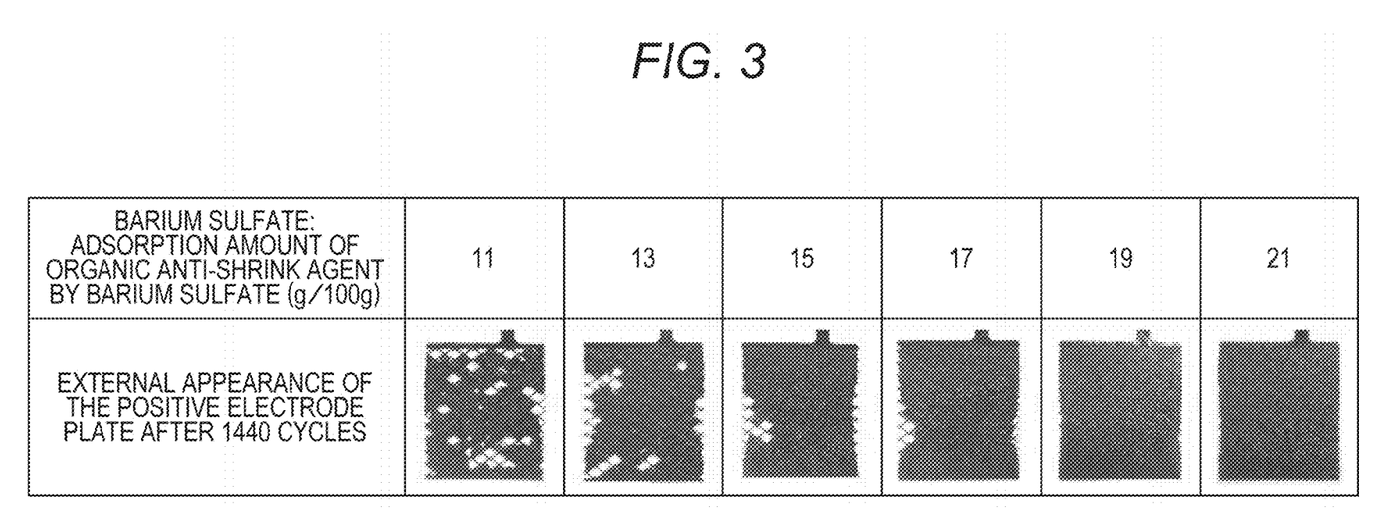
FIG. 3 is a photograph showing external appearances of positive electrode plates at the time of undergoing 1440 cycles of cycle life test.
Figure 4:
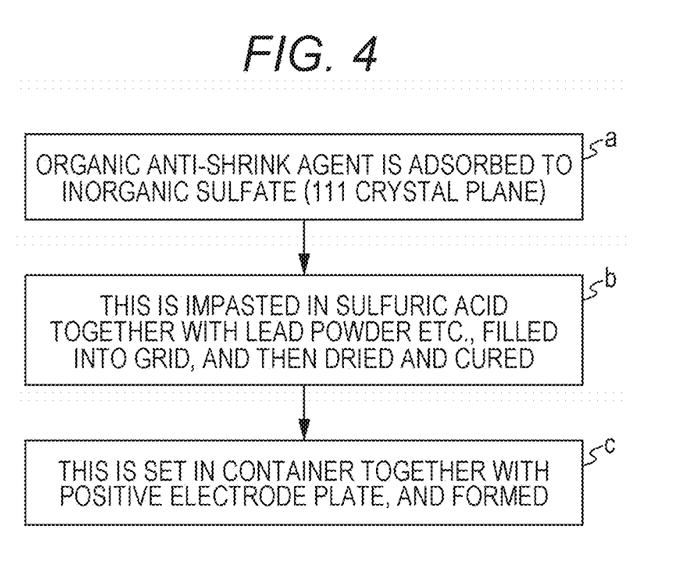
FIG. 4 is a process chart showing a method for producing a lead-acid battery in the example.

FIG. 3 shows a method for producing a lead-acid battery. In "step a", a bisphenol condensation product or lignin is adsorbed to an inorganic sulfate (specifically barium sulfate). In "step b", the barium sulfate with a bisphenol condensation product or lignin adsorbed thereto is impasted in sulfuric acid together with other negative active material such as a lead powder, filled into a grid, and then dried and cured. In "step c", this is set in a container together with a positive electrode plate, the positive electrode plate and the negative electrode plate are separated from each other by a separator, and an electrolyte solution or a gel etc. holding the electrolyte solution is added to provide a lead-acid battery.

Measurement Method.

The content of an inorganic sulfate (specifically barium sulfate; explained with barium sulfate hereinafter) and the adsorption amount of an organic anti-shrink agent in a negative active material (exactly a negative electrode material), the content of an anti-shrink agent (a bisphenol condensation product, lignin or the like; explained with a bisphenol condensation product hereinafter), and the like can be measured in the following manner.

Lead sulfate is reduced to metal lead by performing charge as necessary, a negative active material is then taken out from a negative electrode plate, and washed with water and dried to remove the sulfuric acid component, and the dry mass of the negative active material is measured. The negative active material is crushed, the lead compound is totally dissolved using a reagent such as nitric acid or ammonium acetate, the precipitates are then filtered by suction filtration, a bisphenol condensation product, carbon and the like are combusted at 700° C. in the air, barium sulfate is converted into barium oxide, and the barium oxide is weighed. The content of barium sulfate can be measured from the amount of the negative active material measured beforehand and the amount of barium oxide.

Lead sulfate is reduced to metal lead by performing charge as necessary, a negative active material is then taken out from a negative electrode plate, and washed with water and dried to remove the sulfuric acid component, and the dry mass of the negative active material is measured. The negative active material is crushed, and immersed in, for example, a strong alkaline aqueous solution at 50° C. The concentration of a bisphenol condensation product in the negative active material can be measured from an UV absorption spectrum etc. of the immersion liquid.

The negative active material taken out from a disassembled battery is crushed, the lead compound is totally dissolved using a reagent such as nitric acid or ammonium acetate, and fibers are then removed by a sieve with small openings of about 100 mesh, thereby obtaining a mixture of barium sulfate and carbon in the active material.

Water is added to the obtained mixture, the mixture is sufficiently stirred, and then separated by centrifugal separation, and barium sulfate which is situated at the bottom of the centrifuge tube and contains little carbon is collected, dried and provided as a sample. The obtained sample is analyzed using TG-DTA. Since the substance remaining after TG-DTA is oxidized barium sulfate, the mass of the obtained barium oxide is converted to determine the amount of original barium sulfate. For converting the amount of barium oxide to the amount of barium sulfate, the mass of the sample after analysis may be multiplied by 1.52 (molecular weight of barium oxide: 153.3294, molecular weight of barium sulfate: 233.3926).

For example, if the mass of barium oxide after analysis is 1 g, the mass of original barium sulfate is 1.52 g, and thus the mass of $SO_3$ lost by TG-DTA is 0.52 g.

If the mass of the sample before analysis is 3 g, the mass of the sample lost by TG-DTA analysis is 2 g, and this value includes the mass of the $SO_3$ component contained in barium sulfate, i.e. 0.52 g, so that the amount of the adsorbed organic anti-shrink agent is 2−0.52=1.48 g.

From the amount of the organic anti-shrink agent and the determined amount of barium sulfate, the amount of the organic anti-shrink agent per 1 g of barium sulfate is determined (1.48/1.52), and multiplied by 100 to determine the amount of the organic anti-shrink agent per 100 g of barium sulfate.

The average particle size of barium sulfate can be measured in the following manner. First, the plate is impregnated with a resin. The sample is cut and polished so that the cross-section of the plate can be observed, and the polished surface is immersed in a boiled saturated ammonium acetate solution to dissolve lead sulfate on the polished surface. For the obtained sample, the S distribution is measured by EPMA, and a distribution of barium sulfate in the active material is obtained. The S distribution measurement is performed for each surface polished ten times in the same sample, a distribution map of cross-section diameters of particles is prepared from the obtained S distribution, and an average secondary particle size is estimated.

In the present invention, the amount of the organic anti-shrink agent adsorbed to barium sulfate, the content of barium sulfate, the amount of the organic substance adsorbed to barium sulfate, the average particle size of barium sulfate, the content of the bisphenol condensation product, and the content of lignin are measured by the above-described methods.

Characteristics of Lead-Acid Battery

The lead-acid battery was made to undergo a cycle including discharge at 25 A for 4 minutes and charge at maximum 25 A at 2.47 V/cell for 10 minutes under an atmosphere at 40° C. The lead-acid battery was discharged at 265 A at 40° C. for every 480 cycles, and assumed to reach the life end at the time when the terminal voltage at the 30th second was less than 1.2 V/cell. The lead-acid battery that reached the life end was disassembled, and the concentration of the bisphenol condensation product in the electrolyte solution was measured from the consumption of $KMnO_4$. After elapse of 1440 cycles, the state of falling of the positive active material at the positive electrode plate was observed.

Similarly, the concentration of lignin in the electrolyte solution was measured from the consumption of $KMnO_4$.

Tables 1 to 3 and FIG. 1 show life performance in the cycle life test and the consumption of $KMnO_4$ in the electrolyte solution after the life end with respect to the DBP oil absorption amount, average secondary particle size and content of barium sulfate, the contents of the bisphenol condensation product and lignin, and so on. FIG. 2 shows the external appearance of the positive electrode plate after 1440 cycles. The results are shown as relative values where the value at an adsorption amount of 13 g/100 g (the bisphenol condensation product is adsorbed to barium sulfate before paste formation) is set to 100%. The content is in the unit of mass % in the positive active material.

Table 1 and FIG. 1 show results of changing the adsorption amount while fixing the concentration of barium sulfate to 0.8 mass %. The average secondary particle size of barium sulfate and the absorption amount of the organic anti-shrink agent by barium sulfate increased with the DBP oil absorption amount, and were 3.8 to 9.2 μm and 15 to 21 g/100 g, respectively, when the DBP oil absorption amount was in the range of 14 ML/100 g to 20 mL/100 g.

When the bisphenol condensation product was adsorbed to barium sulfate, the cycle life increased with the adsorption amount of the organic anti-shrink agent, and the consumption of $KMnO_4$ after the life end decreased as the adsorption amount increased. The gray mark in FIG. 1 indicates that 0.2 mass % of lignin and 0.8 mass % of barium sulfate are contained.

TABLE 1

| | Anti-shrink agent | | | | | | | | | | | | |
|---|---|---|---|---|---|---|---|---|---|---|---|---|---|
| | Bisphenol compound 0.1% | | | | | | | Lignin 0.2% | | | | | |
| | | Adsorbed or not adsorbed | | | | | | | | | | | |
| | Not adsorbed | Adsorbed | | | | | | Not adsorbed | Adsorbed | | | | |
| DBP oil absorption amount of barium sulfate (mL/100 g) | 12 | 10 | 12 | 14 | 16 | 18 | 20 | 12 | 10 | 12 | 14 | 16 | 18 | 20 |
| Adsorption amount of organic anti-shrink agent by barium sulfate (g/100 g) | 5 | 11 | 13 | 15 | 17 | 19 | 20.96 | 5 | 11 | 13 | 15 | 17 | 19 | 20.96 |
| Consumption of permanganic acid (relative value %) | 110 | 121 | 100 | 85 | 73 | 65 | 59 | 85 | 85 | 75 | 68 | 62 | 58 | 55 |
| Life (%) | 92 | 92 | 100 | 112 | 127 | 138 | 145 | 90 | 91 | 92 | 93 | 95 | 97 | 100 |
| Average secondary particle size of barium sulfate (μm) | 2.5 | 1 | 2.5 | 3.8 | 5 | 7.8 | 9.2 | 2.5 | 1 | 2.5 | 3.8 | 5 | 7.8 | 9.2 |

The DBP oil absorption amount is within the range of ±1 g, and not less than the lower limit and less than the upper limit (for example, not less than 9 and less than 11 when 10 ± 1).
The adsorption amount of the organic anti-shrink agent is within the range of ±1 g, and not less than the lower limit and less than the upper limit (for example, not less than 11 and less than 13 when 12 ± 1).

TABLE 2

| Adsorption amount of organic anti-shrink agent by barium sulfate (g/100 g) | 17 | | | | | | | | | | 13 | | 17 | | | | |
|---|---|---|---|---|---|---|---|---|---|---|---|---|---|---|---|---|---|
| Content of barium sulfate (mass %) | 0.8 | | | | | | | | | | 0.6 | | 1.0 | | | | |
| Type of anti-shrink agent | Lignin | | | | | Bisphenol compound | | | | | | | | | | | |
| Content of anti-shrink agent (mass %) | 0 | 0.1 | 0.1 | 0.2 | 0.3 | 0 | 0.05 | 0.1 | 0.2 | 0.25 | 0.1 | 0.05 | 0.1 | 0.2 | 0.05 | 0.1 | 0.2 |
| Life (%) | 70 | 75 | 85 | 92 | 95 | 102 | 116 | 127 | 118 | 106 | 100 | 109 | 120 | 110 | 110 | 121 | 110 |

Table 2 shows the results of changing the contents of the bisphenol condensation product and lignin as the anti-shrink agent under the condition of 0.8 mass % of barium sulfate with an adsorption amount of 17 g/100 g. In addition, Table 2 shows a comparative example in which the sample contains 0.8 mass % of barium sulfate with an adsorption amount of 13 g/1.00 g and 0.1 mass % of the bisphenol condensation product. When the bisphenol condensation product was adsorbed to barium sulfate with an adsorption amount of 17 g/1.00 g, life performance was improved as compared to the case where 0.1 mass % of the bisphenol condensation product (optimum concentration) was adsorbed in an amount of 13 g/100 to barium sulfate. It is apparent that the concentration of the bisphenol condensation product is preferably not less than 0.03 mass % and not more than 0.25 mass %, particularly preferably not less than 0.05 mass % and not more than 0.2 mass %.

TABLE 3

| Adsorption amount of organic anti-shrink agent by barium sulfate (g/100 g) | 17 | | | | | | | | 13 |
|---|---|---|---|---|---|---|---|---|---|
| Content of barium sulfate (mass %) | 0.4 | 0.6 | 0.8 | 1 | 1.2 | 1.4 | 1.5 | 1.6 | 0.8 |
| Life (%) | 102 | 120 | 127 | 121 | 108 | 100 | 100 | 98 | 100 |
| Consumption of permanganic acid (relative value %) | 89 | 78 | 73 | 72 | 70 | 70 | 67 | 65 | 100 |

Bisphenol condensation product 0.1 mass %

Table 3 shows the results of changing the concentration of barium sulfate with an adsorption amount of 17 g/100 g while fixing the concentration of the bisphenol condensation product to 0.1 mass %. When the concentration of barium sulfate was not less than 0.4 mass % and not more than 1.2 mass %, life performance was improved as compared to 0.8 mass % of barium sulfate with an adsorption amount of 13 g/100 g. Particularly, when the concentration of barium sulfate was not less than 0.6 mass % and not more than 1.0 mass %, life performance was remarkably improved.

The negative electrode plate after the life end was disassembled, and barium sulfate was extracted by centrifugal separation. Brown color development originating from the bisphenol condensation product became stronger as the DBP oil absorption amount became higher (the adsorption amount became larger), and thus it was found that the bisphenol condensation product was adsorbed by barium sulfate until the life end as in the case of $KMnO_4$ consumption measurement.

FIG. 2 shows the external appearance of the positive electrode plate after 1440 cycles. Falling of the positive active material was remarkable when the adsorption amount by barium sulfate was 11 g/100 g, and falling was significant at 13 g/100 g, but at 15 g/100 g, the number of falling spots was reduced to about ½ of that at 13 g/100 g. The number of falling spots was rather all at 17 g/100 g, and falling of the positive active material was extremely small at 19 g/100 g and 21 g/100 g.

Supplementary

In addition to the bisphenol condensation product, a small amount of lignin sulfonic acid, e.g. 0.1 mass % or less based on the amount of the negative active material, may be added. In the present invention, the bisphenol condensation product is adsorbed to barium sulfate, and thereby fixed in the negative active material. However, the total amount of the bisphenol condensation product is not required to be adsorbed to barium sulfate. The concentration of the bisphenol condensation product in the negative active material decreases with the use of the storage battery, the secondary particle size of barium sulfate decreases with the use of the storage battery, and the DBP oil absorption amount and the adsorption amount of the organic anti-shrink agent are accordingly changed. If these values cause inconvenience, values in the initial stage of the life of the storage battery shall be used.

What is claimed is:

1. A lead-acid battery comprising:
  a negative electrode plate;
  a positive electrode plate; and
  an electrolyte solution,
  wherein the negative electrode plate includes a negative electrode material containing an inorganic sulfate and a bisphenol condensation product,
  the inorganic sulfate has a 111 crystal plane,
  the bisphenol condensation product is adsorbed to the inorganic sulfate, and
  an amount of the bisphenol condensation product adsorbed to the inorganic sulfate is 15 g/100 g or more and 21 g/100 g or less.

2. The lead-acid battery according to claim 1, wherein the amount of the bisphenol condensation product adsorbed to the inorganic sulfate is not less than 17 g/100 g and not more than 21 g/100 g.

3. The lead-acid battery according to claim 1, wherein the amount of the bisphenol condensation product adsorbed to the inorganic sulfate is not less than 15 g/100 g and not more than 19 g/100 g.

4. The lead-acid battery according to claim 1, wherein the amount of the bisphenol condensation product adsorbed to the inorganic sulfate is not less than 17 g/100 g and not more than 19 g/100 g.

5. The lead-acid battery according to claim 1, wherein the content of the inorganic sulfate in the negative electrode material is not less than 0.4 mass % and not more than 1.6 mass % based on a total mass of the negative electrode material.

6. The lead-acid battery according to claim 1, wherein the content of the inorganic sulfate in the negative electrode material is not less than 0.4 mass % and not more than 1.5 mass % based on a total mass of the negative electrode material.

7. The lead-acid battery according to claim 1, wherein the content of the inorganic sulfate in the negative electrode material is not less than 0.4 mass % and not more than 1.2 mass % based on a total mass of the negative electrode material.

8. The lead-acid battery according to claim 1, wherein the content of the inorganic sulfate in the negative electrode material is not less than 0.6 mass % and not more than 1.0 mass % based on a total mass of the negative electrode material.

9. The lead-acid battery according to claim 1, wherein the content of the bisphenol condensation product in the negative electrode material is not less than 0.03 mass % and not more than 0.25 mass % based on a total mass of the negative electrode material.

10. The lead-acid battery according to claim 1, wherein the content of the bisphenol condensation product in the negative electrode material is not less than 0.05 mass % and not more than 0.20 mass % based on a total mass of the negative electrode material.

11. The lead-acid battery according to claim 1, wherein the inorganic sulfate in the negative electrode material is barium sulfate.

12. A method for producing the lead-acid battery according to claim 1, the method comprising:
   adsorbing the bisphenol condensation product to the inorganic sulfate having a 111 crystal plane in an amount of 15 g/100 g or more and 21 g/100 g or less; and
   after adsorbing the bisphenol condensation product to the inorganic sulfate, filling a negative electrode current collector with a paste, which contains the inorganic sulfate with the bisphenol condensation product adsorbed thereto, and a lead powder, to produce the negative electrode plate.

13. The method for producing a lead-acid battery, according to claim 12, wherein the inorganic sulfate is barium sulfate.

14. A method for producing a lead-acid battery, comprising:
   mixing a bisphenol condensation product and an inorganic sulfate having a 111 crystal plane such that the bisphenol condensation product is adsorbed to the inorganic sulfate;
   after mixing the bisphenol condensation product and the inorganic sulfate, obtaining a paste by mixing a lead powder and carbon with the inorganic sulfate to which the bisphenol condensation product is adsorbed; and
   filling a negative electrode current collector with the paste,
   wherein an amount of the bisphenol condensation product adsorbed to the inorganic sulfate is 15 g/100 g or more and 21 g/100 g or less.

15. A lead-acid battery comprising:
   a negative electrode plate;
   a positive electrode plate; and
   an electrolyte solution,
   wherein the negative electrode plate includes a negative electrode material containing an anti-shrink agent and an aggregate consisting of primary particles of an inorganic sulfate,
   an average particle size of the aggregate is 3.8 μm or more, and
   the anti-shrink agent is a bisphenol condensation product.

* * * * *